(12) United States Patent
Yin et al.

(10) Patent No.: US 12,294,430 B2
(45) Date of Patent: May 6, 2025

(54) SIGNAL PROCESSING DEVICE AND BASE STATION ANTENNA

(71) Applicant: Outdoor Wireless Networks LLC, Claremont, NC (US)

(72) Inventors: Zhiwei Yin, Suzhou (CN); Fangwen Wan, Suzhou (CN); Dingshu Jin, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 331 days.

(21) Appl. No.: 18/092,965

(22) Filed: Jan. 4, 2023

(65) Prior Publication Data

US 2023/0216562 A1 Jul. 6, 2023

(30) Foreign Application Priority Data

Jan. 5, 2022 (CN) .......................... 202210003714.2

(51) Int. Cl.
*H04B 7/06* (2006.01)
(52) U.S. Cl.
CPC .................. *H04B 7/0617* (2013.01)

(58) Field of Classification Search
CPC ........ H04B 7/0617; H01Q 1/246; H01Q 1/36; H01Q 15/14; H04W 88/08
USPC .......................................................... 375/267
See application file for complete search history.

(56) References Cited

U.S. PATENT DOCUMENTS

| | | | |
|---|---|---|---|
| 10,720,985 B1* | 7/2020 | Kanar | H04W 16/28 |
| 2020/0365988 A1* | 11/2020 | Bourderionnet | H04B 10/2575 |
| 2022/0140869 A1* | 5/2022 | Ji | H01Q 1/42 |
| | | | 375/262 |
| 2024/0047861 A1 | 2/2024 | Zimmerman et al. | |

* cited by examiner

*Primary Examiner* — Fitwi Y Hailegiorgis
(74) *Attorney, Agent, or Firm* — Myers Bigel, P.A.

(57) ABSTRACT

The present disclosure relates to a signal processing device and a base station antenna. The signal processing device comprises: a substrate; a beam-forming network, which is provided on one side of the substrate; and a calibration circuit, which is provided on the same side of the substrate on which the beam-forming network is provided; wherein the beam-forming network is connected to the calibration circuit via a connecting trace on the substrate.

20 Claims, 4 Drawing Sheets

SIGNAL PROCESSING DEVICE AND BASE STATION ANTENNA

CROSS-REFERENCE TO RELATED APPLICATION

The present application claims the benefit of priority to Chinese Patent Application No. 202210003714.2, filed on Jan. 5, 2022, with the China National Intellectual Property Administration, and the entire contents of the above-identified application are incorporated by reference as if set forth herein.

TECHNICAL FIELD

The present disclosure generally relates to the technical field of radio communication, and more particularly, to a signal processing device and a base station antenna.

BACKGROUND

Cellular communications systems are well known in the field of radio communication. In a typical cellular communication system, a geographic area may be divided into a series of regions that are referred to as "cells," and each cell is served by a "macro cell" base station. For example, each cell can have an area of the order of 1 to 50 $km^2$, where the size of the cell depends on topography and population density. Base stations may include baseband equipment, radio devices, and base station antennas, thereby providing two-way RF ("RF") communication with fixed and mobile subscribers ("users") located throughout the cell. Base station antennas are usually installed on towers or other raised structures, where radiation beams ("antenna beam") generated by each antenna are directed outwards to serve the entire cell or a part of the cell ("sector"). Generally, a base station antenna includes one or more phased arrays of radiating elements, wherein the radiating elements are arranged in one or more vertical columns when the antenna is installed and used. Here, "vertical" refers to a direction that is substantially perpendicular to the plane defined by the horizon.

To increase capacity, cellular operators deploy so-called "small cell" base stations. A small cell base station refers to a low-power base station that serves a much smaller region than a typical macro cell base station serves. Herein, the term "small cell" can cover base stations in small cells, microcells, picocells, and other base stations serving small geographic areas. For example, a small cell base station can be used to provide cellular coverage for high-traffic areas in a macro cell, which allows a macro cell base station to unload a large part or all of the traffic near the small cell to the small cell base station.

FIG. 1 is a structural schematic diagram of a conventional small cell base station 10. The base station 10 includes an antenna 20 that can be mounted on a raised structure 30. Generally, the antenna 20 of the small cell base station may be designed to provide omnidirectional coverage in the azimuth plane, which means that the antenna beam generated by the antenna 20 extends through a full 360° circle in the azimuth plane, and it can have a suitable beam width in an elevation plane (for example, 10° to 30°). The antenna beam may optionally be slightly down-tilted in the elevation plane (it can be a physical down-tilt or an electronic down-tilt) to reduce the overflow of the antenna beam of the small cell base station antenna to areas outside the small cell, and this also reduces interference between the small cell base station and other base stations.

The small cell base station 10 may further include base station equipment, such as one or more baseband units 40 and radios 42. The baseband unit 40 can receive data from another source, such as a backhaul network, and can process the data and provide a data stream to the radio 42. The radio 42 may generate an RF signal that includes encoded data, and may amplify and pass these RF signals to the antenna 20 for transmission via a cable connection 46 for example. The radio 42 may form multiple RF signals based on the baseband data flow and transmit each RF signal to a corresponding output terminal ("radio terminal") of the radio 42. In some cases, the antenna 20 may be a so-called "active antenna" in which the radio 42 is directly mounted on the antenna 20 or implemented within the antenna 20. Active antennas are capable of electronically changing the shape and size of the generated antenna beams, and hence are also referred to as "beam-forming antennas." It will also be understood that the small cell base station 10 in FIG. 1 may usually include various other equipment, such as a power supply, a backup battery, a power bus, a controller and so on.

Some beam-forming antennas include a beam-forming network that processes RF signals that are fed to a plurality of columns of radiating elements of the beam-forming antenna. For example, in some beam-forming antennas, each radio terminal is coupled to a different column of radiating elements in a multi-column array of radiating elements through the beam-forming network. The amplitude and phase of each RF signal can be set by the radio 42 and the beam-forming network, so that the columns of the radiating elements work together to form a more focused antenna beam with higher gain and a narrower beam width in the azimuth plane. In a time division duplex ("TDD") transmission scheme, the antenna beam can be changed on a time-slot-by-slot basis so that the shape and pointing direction of the antenna beam can be electronically "manipulated" in the azimuth plane during each time slot to point to or approach a served user (the pointing direction of the antenna beam refers to a direction in which the antenna beam has a peak gain). In other cases, the antenna may be arranged as a plurality of input ports of a sub-array in the direction of an elevation angle and the azimuth direction, so that the antenna beam can be electronically manipulated and narrowed in both the azimuth plane and the elevation plane. Since beam-forming antennas have the ability to narrow the azimuth (or elevation) beam width and scan the antenna beam in the direction of a specific user, they can show higher antenna gain and support increased capacity.

The base station antenna may also include a calibration circuit that extracts part of a test signal transmitted to the array of radiating elements. By comparing the extracted part of the test signal with a reference signal, the weighting of the amplitude and phase of the signal to be transmitted can be changed to achieve signal calibration.

With the increase of the requirements for miniaturization and integration of the small cell base station 10, it may be desirable to improve the layout of various components in the small cell base station 10.

SUMMARY

An object of the present disclosure is to provide a signal processing device and a base station antenna.

According to some aspects of the present disclosure, a signal processing device is provided, and the signal processing device includes: a substrate; a beam-forming network provided on one side of the substrate; and a calibration circuit, provided on the same side of the substrate on which the beam-forming network is provided; wherein, the beam-forming network is connected to the calibration circuit via a connection trace on the substrate.

According to some aspects of the present disclosure, a base station antenna is provided, comprising: a reflector assembly, including a plurality of reflector plates facing different directions; a plurality of sets of radiating element arrays, each set of radiating element arrays in the plurality of sets of radiating element arrays being respectively arranged on an outer side of a corresponding reflector plate of the plurality of reflector plates; and the signal processing device as mentioned above, wherein the beam-forming network of the signal processing device is connected to the plurality of sets of radiating element arrays, and the signal processing device is provided in a space inside the plurality of reflector plates.

BRIEF DESCRIPTION OF THE DRAWINGS

The attached drawings, which form a part of the specification, describe embodiments of the present disclosure and, together with the specification, are used to explain the principles of the present disclosure.

The present disclosure can be understood more clearly according to the following detailed description with reference to the drawings, in which.

Figure 1:
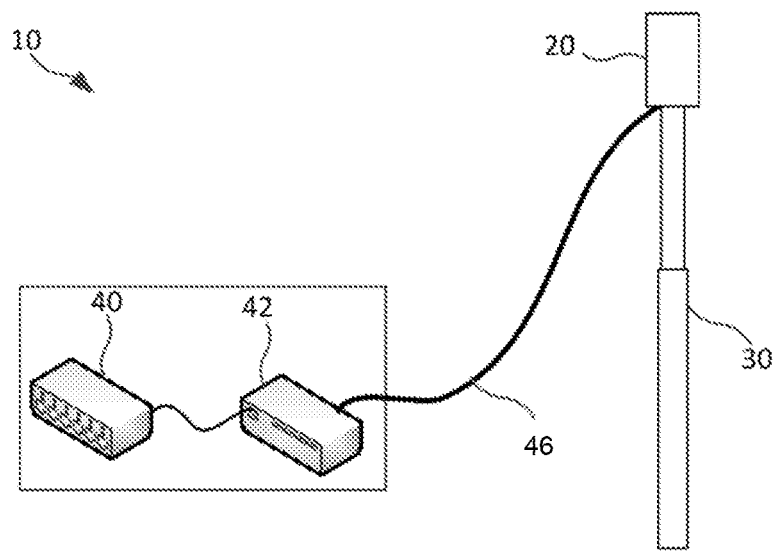
FIG. 1 is a structural schematic diagram of a base station.

Note that in the embodiments described below, the same signs are sometimes used in common between different drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like sometimes may not indicate the actual position, dimension, and range. Therefore, the present disclosure is not limited to the positions, dimensions, and ranges disclosed in the attached drawings and the like.

DETAILED DESCRIPTION

Various exemplary embodiments of the present disclosure will be described in detail below by referencing the attached drawings. It should be noted: unless otherwise specifically stated, the relative arrangement, numerical expressions and numerical values of components and steps set forth in these embodiments do not limit the scope of the present disclosure.

The following description of at least one exemplary embodiment is only illustrative, and in no way serves as any limitation to the present disclosure and its application or use. In other words, the structure and method herein are shown in an exemplary manner to illustrate different embodiments of the structure and method in the present disclosure. Those of ordinary skill in the art will understand that the one or more examples provided herein are merely illustrative, and do not indicate exhaustively the embodiments of the present disclosure. In addition, the drawings are not necessarily drawn to scale, and some features may be enlarged to show details of some specific components.

The technologies, methods, and equipment known to those of ordinary skill in the art may not be discussed in detail, but where appropriate, the technologies, methods, and equipment should be regarded as part of the specification.

In all examples shown and discussed herein, any specific value should be construed as merely exemplary value and not as limitative value. Therefore, other examples of the exemplary embodiments may have different values.

With the introduction of the fifth generation ("5G") cellular system, beam-forming antennas are now widely deployed. Most of these antennas are "flat-panel" antennas that can provide coverage to 120° sectors of the base station. These antennas usually include a plurality of linear arrays of radiating elements or one or more multi-column arrays of radiating elements, all of which are mounted on a reflector of the flat-panel antenna. The linear arrays of the radiating elements can be designed to generate static antenna beams covering the entire 120° sector, while the multi-column arrays are designed to work with the radios and beam-forming networks to generate more focused antenna beams with higher antenna gain, and can be electronically manipulated to cover different parts of the 120° sector. For example, 8T/8R radio devices and beam-forming networks have been developed, which are usually used with four-column arrays of radiating elements. The 8T/8R radios may have a total of eight radio terminals, of which four radio terminals are coupled to the −45° radiators of the radiating elements in the four columns of the array (one radio terminal per column) via the beam-forming network, and the other four radio terminals are coupled to the +45° radiators of the radiating elements in the four columns of the array (one radio terminal per column) via the beam-forming network. The four-column array can simultaneously generate a pair of antenna beams, that is, an antenna beam at each polarization. The 8T/8R radio sets the amplitudes and phases of the RF signals output through each radio terminal so that the generated antenna beam has a reduced beam width in the azimuth plane. Therefore, it has a higher antenna gain, and the antenna beam can also be electronically manipulated in the azimuth plane to point to a desired direction. For example, the 8T/8R radio can change the direction of the generated antenna beam on a time slot-by-slot basis of a TDD communication scheme.

In addition, the beam-forming base station antenna may further include a calibration circuit (which is typically implemented on a printed circuit board and referred to as a calibration circuit board) to extract part of a test signal that is transmitted to the radiating elements. By comparing the extracted part of the test signal with a reference signal, the weighting of the amplitudes and phases of the signal to be transmitted can be determined to achieve a desired beam pattern.

The calibration circuit board and the beam forming network are usually arranged separately. For example, the calibration circuit board can be arranged close to the radiating elements, and the beam-forming network can be arranged far away from the radiating elements. In order to achieve signal transmission therebetween, terminals of the calibration circuit board and corresponding terminals of the beam-forming network can be connected together by, for example, coaxial cables. However, the coaxial cables can occupy a significant amount of space, and add to the cost and weight of the antenna. In addition, the coaxial cables may increase insertion loss, cause impedance matching problems, and require soldered connections that are potential sources of passive intermodulation distortion ("PIM") signals, all of which may degrade the performance of the base station antenna.

In order to solve the above problems, the present disclosure provides a signal processing device and a base station antenna including the signal processing device. The base station antenna can be a small cell beam-forming base station antenna. The signal processing device may include a beam-forming network and a calibration circuit that are integrated on the same substrate, and thus there is no need to use, for example, coaxial cables and the like to connect the beam-forming network to the calibration circuit, which helps to improve the integration of the base station antenna, making the base station antenna smaller, as well as improving the performance of the base station antenna and reducing the manufacturing cost.

Figure 2:
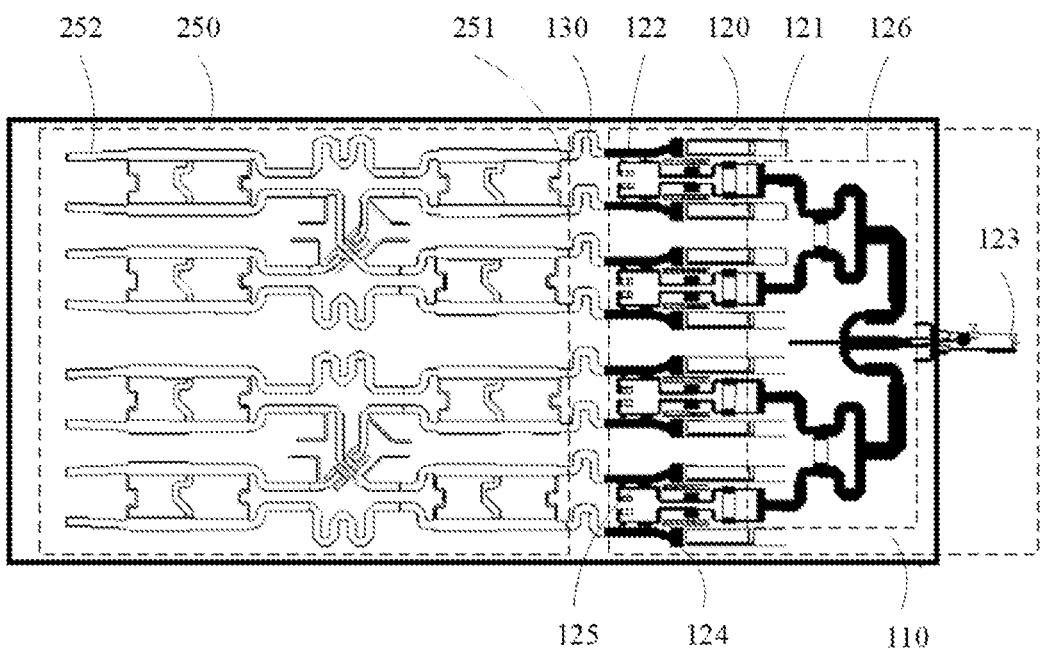
FIG. 2 is a structural schematic diagram of a signal processing device according to an exemplary embodiment of the present disclosure.

As shown in FIG. 2, the signal processing device may comprise a substrate 110, a beam-forming network 250, and a calibration circuit 120. Here, the beam-forming network 250 and the calibration circuit 120 may be provided on the same side of the substrate 110, and the beam-forming network 250 may be connected to the calibration circuit 120 through connection traces 130 on the substrate 110. It can be understood that the beam-forming network 250 and the calibration circuit 120 themselves can also be formed by corresponding traces on the substrate 110. In this way, the beam-forming network 250 may no longer need to be connected to the calibration circuit 120 through coaxial cables.

In some embodiments, at least a part of the beam-forming network 250, at least a part of the calibration circuit 120, and the connection traces 130 may be integrally formed. Specifically, at least a part of the beam-forming network 250, at least a part of the calibration circuit 120, and the connection traces 130 may be formed in the same process step or in the same set of process steps. For example, a patterned metal pattern, which may include at least a part of the beam-forming network 250, at least a part of the calibration circuit 120, and the connection traces 130, may be integrally formed on the substrate 110 through one or more steps. However, it can be understood that, as needed, the beam-forming network 250, the calibration circuit 120, and the connection traces 130 may also be formed in different process steps, but they will all be integrated on the substrate 110, and there is no need to use other additional connecting components to achieve the connection between the beam-forming network 250 and the calibration circuit 120.

In some embodiments, at least a part of the beam-forming network 250, at least a part of the calibration circuit 120, and the connection traces 130 may be formed of the same material. Or, depending on actual needs, the beam-forming network 250, the calibration circuit 120, and the connection traces 130 may also contain different materials.

According to different ways of dividing the pattern on the substrate 110, each connection trace 130 may be considered to be a part of a trace that is part of at least one of the beam-forming network 250 and the calibration circuit 120. For example, each connection trace 130 may be considered to be a part of the beam-forming network 250, or may be considered to be a part of the calibration circuit 120, or a first part of each connection trace 130 may be considered to be part of the beam-forming network 250 and a second part of each connection trace 130 may be considered to be part of the calibration circuit 120. In this case, it can also be considered that the beam-forming network 250 and the calibration circuit 120 are directly connected, and there are no other connecting components such as connection terminals and cables between them. However, it can be understood that the connection traces 130 may also be considered to be separate parts that are not part of either the beam-forming network 250 or the calibration circuit 120. This is only a difference in the division method and has no effect on the structure of the actual signal processing device.

Furthermore, in order to improve the signal transmission performance of the signal transmission device, the shape of each connection trace 130 may be configured to match impedance at the connections to the beam-forming network 250 and the calibration circuit 120. In other words, at the connection between the beam-forming network 250 and the calibration circuit 120, the impedance of the calibration circuit 120 seen by the beam-forming network 250 is equal to the impedance of the beam-forming network 250 seen by the calibration circuit 120, thereby reducing or avoiding reflection when the signal enters the input port of the beam-forming network 250 from the output port of the calibration circuit 120.

In some embodiments, as shown in FIG. 2, some or all of the connection traces 130 may include respective meandered portions. The meandered portions increase the length of each connection trace 130, which may improve impedance matching. In some embodiments, the meandered portions may be formed by one or more "S" shaped traces or reverse "S" shaped traces that are mutually connected. It can be understood that the meandered portions can also have other shapes, as long as its length meets the requirement of impedance matching, and there is no limit here.

As shown in FIG. 2, the beam-forming network 250 may comprise a plurality of input ports 251, the calibration circuit 120 may comprise a plurality of output ports 122, and each input port 251 of the plurality of input ports 251 of the beam-forming network 250 may be respectively connected to a corresponding output port 122 of the plurality of output ports 122 of the calibration circuit 120 via a corresponding connection trace 130. In other words, the number of the input ports 251 of the beam-forming network 250, the number of the output ports 122 of the calibration circuit 120, and the number of the connection traces 130 may be equal to each other, and they may be connected in a one-to-one corresponding manner as shown in FIG. 2.

Furthermore, in order to avoid mutual interference between the signals that travel along the connection traces 130 at the same time, the plurality of connection traces 130 on the substrate 110 may extend in parallel with each other to keep a separation distance, which should be sufficient to avoid interference, between adjacent connection traces 130. In addition, in order to make full use of the layout space on the substrate 110 so that the separation distance between each adjacent pair of connection traces 130 is sufficient to avoid interference between signals, the plurality of connection traces 130 may be uniformly dispersed on the substrate 110 in a direction perpendicular to the extension of the connection traces 130, instead of being centrally distributed in a small part of the substrate 110.

The beam-forming network 250 may include a passive beam-forming network, and the passive beam-forming network may include a Butler matrix. In the specific embodiment shown in FIG. 2, the beam-forming network 250 includes two Butler matrices, which can respectively feed different radiating element arrays, or feed radiators with different polarizations of radiating elements in the same array of radiating elements. It can be understood that the beam-forming network 250 can also include more or less Butler matrices according to actual needs, and/or may be implemented with circuits other than Butler matrices.

Figure 3:
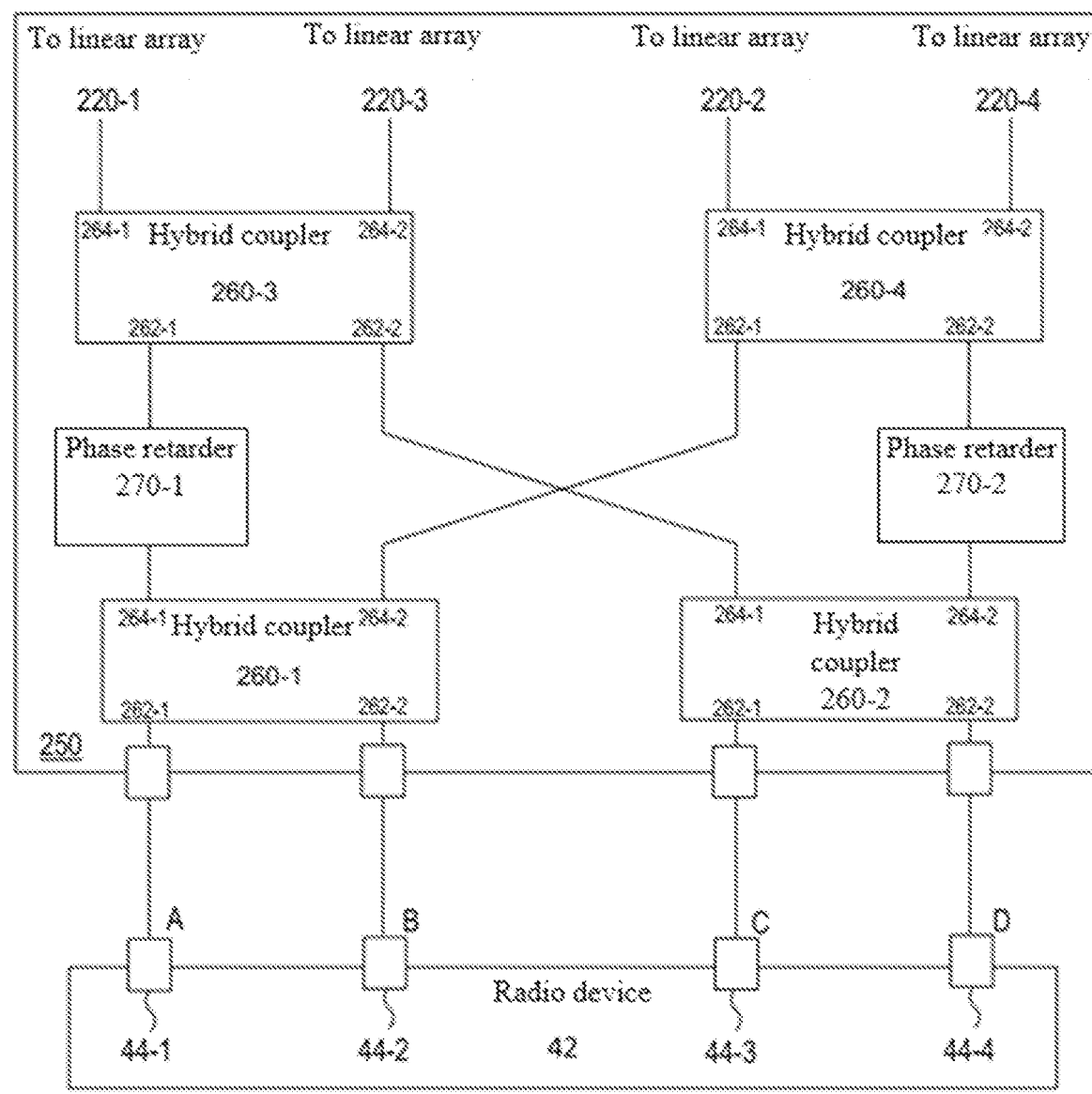
FIG. 3 is a schematic circuit diagram of a beam-forming network and a radio in a base station antenna according to an exemplary embodiment of the present disclosure.

Furthermore, as shown in FIG. 3, the Butler matrix may comprise a first hybrid coupler 260-1, a second hybrid coupler 260-2, a third hybrid coupler 260-3 and a fourth hybrid coupler 260-4, as well as a first phase retarder 270-1 and a second phase retarder 270-2. A first input port 262-1 of the first hybrid coupler 260-1 may be used as a first input port of the Butler matrix, a second input port 262-2 of the first hybrid coupler 260-1 may be used as a second input port of the Butler matrix, a first output port 264-1 of the first hybrid coupler 260-1 may be connected to a first input port 262-1 of the third hybrid coupler 260-3 via the first phase retarder 270-1, and a second output port 264-2 of the first hybrid coupler 260-1 may be connected to a first input port 262-1 of the fourth hybrid coupler 260-4; a first input port 262-1 of the second hybrid coupler 260-2 may be used as a third input port of the Butler matrix, a second input port 262-2 of the second hybrid coupler 260-2 may be used as a fourth input port of the Butler matrix, a first output port 264-1 of the second hybrid coupler 260-2 may be connected to a second input port 262-2 of the third hybrid coupler 260-3, and a second output port 264-2 of the second hybrid coupler 260-2 may be connected to a second input port 262-2 of the fourth hybrid coupler 260-4 via the second phase retarder 270-2; a first output port 264-1 of the third hybrid coupler 260-3 may be used as a first output port of the Butler matrix, and a second output port 264-2 of the third hybrid coupler 260-3 may be used as a second output port of the Butler matrix; and a first output port 264-1 of the fourth hybrid coupler 260-4 may be used as a third output port of the Butler matrix, and a second output port 264-2 of the fourth hybrid coupler 260-4 may be used as a fourth output port of the Butler matrix. Here, the first phase retarder 270-1 and the second phase retarder 270-2 may be respectively 45° phase retardation (delay) traces. In addition, corresponding connection terminals may be connected at each output port of the Butler matrix to transmit the signal to components external to the signal processing device. In the following text, the working principle of the beam-forming network will also be explained in detail in combination with other components of the base station antenna.

As shown in FIG. 2, the calibration circuit 120 may include a plurality of transmission paths 124, a plurality of coupling paths 125, and a power divider 126. The plurality of transmission paths 124 may be respectively connected between a corresponding input port 121 of the plurality of input ports 121 and a corresponding output port 122 of the plurality of output ports 122 of the calibration circuit 120. Each coupling path 125 of the plurality of coupling paths 125 may be arranged at least partially adjacent to a corresponding transmission path 124 of the plurality of transmission paths 124 such that a part of a signal in a transmission path 124 corresponding to each coupling path 125 is coupled to the transmission path 124 and travels in the coupling path 125. A plurality of input ports of the power divider 126 may be respectively connected to the plurality of coupling paths 125, and an output port of the power divider 126 may be used as a calibration port 123 of the calibration circuit. Here, each input port 121 and calibration port 123 of the calibration circuit 120 may be connected to a corresponding connection terminal to achieve signal transmission with other components other than the signal processing device. The lengths of each transmission path 124 of the calibration circuit 120 may be equal, the lengths of each coupling path 125 may be equal, and the lengths of each assigned path connected between each input port and output port of the power divider 126 may be equal. Such a setting can ensure that the changes in signal amplitude and phase introduced by each individual signal path in the calibration circuit 120 are basically equal, thereby avoiding inaccuracy in the calibration results due to the difference in the amplitude and phase in multiple signals introduced by the calibration circuit 120 itself.

During calibration, a plurality of test signals can be generated by the radio and respectively input at the corresponding input ports 121 of the calibration circuit 120. A part of each test signal in these test signals may be coupled to the coupling path 125 from the transmission path 124 and output at the calibration port 123 after combination by the power divider 126. By comparing the output signal output from the calibration port 123 with a reference signal, the amplitude and phase of the signal generated by the active transceiver can be adjusted, thereby achieving a desired beam pattern.

In the signal processing device of the present disclosure, the beam-forming network and the calibration circuit are integrated on the same substrate and directly connected through connection traces on the substrate. Therefore, there is no need to use other components such as cables and connection terminals to achieve the connection between them, which helps to realize the miniaturization and high integration requirements of the signal processing device and the base station antenna. In addition, the impedance matching between the beam-forming network and the calibration circuit can be easily realized by adjusting the length of the connection trace, etc., and the attenuation of the signal in the transmission process can also be effectively reduced, which helps to improve the transmission performance of the base station antenna. Furthermore, since the beam-forming network, the calibration circuit and the connection trace can be at least partially formed integrally and there is no need for additional connecting components, the cost of the signal processing device and the base station antenna can be reduced.

The present disclosure also proposes a base station antenna. The base station antenna may include a reflector assembly, a plurality of sets of radiating element arrays, and the above-mentioned signal processing device. The reflector assembly may include a plurality of reflector plates facing different directions (which may be separate plates or a single structure that is bent to form the plates facing in different directions). Each set of radiating element arrays may be respectively arranged on an outer side of a corresponding reflector plate, and the signal processing device may be arranged in a space defined inside the plurality of reflector plates. The beam-forming network of the signal processing device may be connected to the plurality of sets of radiating element arrays, thereby providing the corresponding RF signal to the radiating elements.

The base station antenna of the present disclosure may use basically all of the transmit power of the radio to generate a directional radiation pattern during any given time slot while providing full 360° coverage in the azimuth plane. The small cell base station antenna according to the embodiment of the present disclosure can support a higher level of effective isotropic radiating power (EIRP) than the conventional small cell beam-forming system, and, in example embodiments, can work in a frequency band of about 3.3 GHz to 4.2 GHz or a part thereof.

In some embodiments, the beam-forming antennas according to embodiments of the present disclosure may include four linear arrays of radiating elements mounted on four main surfaces of a tubular reflector assembly that has a horizontal cross-section with a substantially rectangular shape. The pointing direction of the azimuth visual axis of each linear array may deviate by about 90°, about 180° and about 270° respectively from the pointing direction of the azimuth visual axis of the remaining three linear arrays. The radiation elements in each linear array may include dual-polarized radiating elements, such as −45°/+45° tilted cross dipole radiating elements. The radiating element may have a directional pattern in the azimuth plane, such as an azimuth half-power beam width between 50° and 100°. Each linear array in the four linear arrays can be connected to two RF terminals (one for each polarization) of the antenna, and the eight RF terminals can be connected to the corresponding radio terminals on an eight-terminal 5G 8T/8R radio through the beam-forming network. Each linear array can form a pair of directional antenna beams (one at each polarization). For example, each antenna beam can provide a coverage of about 90° in the azimuth plane.

In some embodiments, the small cell base station antenna may use a passive beam-forming network such as a 4×4 Butler matrix to combine RF signals output by four radio terminals associated with one polarization, and then output the combined signals through one output port of the four output ports of the beam-forming network to form a "sector" antenna beam that provides 90° sector coverage in the azimuth plane, for example. The radio may set the weighting of the amplitude and phase of the RF signal output from each radio terminal in one of four ways. Each weighting setting in the four different weighting settings directs all RF energy output at the four radio terminals of the radio to a selected one of the four linear arrays. In other words, the 5G radio and the passive beam-forming network can be configured to work together to feed the signals output by all four radio terminals into a single one of the linear arrays. This operation can be performed for each of the two polarizations, so that all the RF energy output by the 5G radio during any given time slot can be radiated by a selected one of the four linear arrays. The radio may optionally be programmed to output the RF energy to two of the linear arrays during time slots serving users located at overlapping edges of the coverage areas of two adjacent linear arrays.

In addition, by adjusting the weighting settings, antenna beams with other shapes and/or pointing directions may be formed. For example, the technology can be used to change the direction of the visual axis of the sector antenna beam, so that the peak gain of the sector antenna beam can point at any angle in the azimuth plane. The beam-forming antennas according to embodiments of the present disclosure may also be configured to form antenna beams with other shapes only by changing the weighting setting. For example, the antennas may be configured to form antenna beams with omnidirectional, heart-shaped and/or bidirectional radiation patterns in the azimuth plane simply by applying appropriate weighting settings in the radio. Therefore, the combination of a single beam-forming antenna with an off-the-shelf 5G radio can form any standard antenna pattern usually expected by cellular operators.

The Butler matrix based beam-forming networks are usually used to couple a plurality of radio terminals to a planar multi-column array of radiating elements. For example, a Butler matrix can be used to allow two same polarization radio terminals to share a multi-column array of radiating elements, so that each radio terminal is coupled to all radiating elements in the array. The Butler matrix is generally configured to couple two radio terminals to a multi-column array in such a manner that an RF signal from a first radio terminal generates a first antenna beam pointing in a first direction in the azimuth plane, while an RF signal from a second radio terminal generates a second antenna beam pointing in a different second direction in the azimuth plane. This kind of antenna is usually used in sector segmentation applications, where the first antenna beam covers a first part of the sector of the base station (for example, the left side of the 120° sector), while the second antenna beam covers a second part of the sector (for example, the right side of the 120° sector). The embodiments of the present disclosure use the Butler matrix beam-forming network in a completely different way. The Butler matrix can act as a power combiner and switch, allowing all output power of the radio device to be transmitted to a selected one of a plurality of linear arrays. The Butler matrix can have excellent power processing ability and good passive intermodulation distortion performance.

Figure 4:
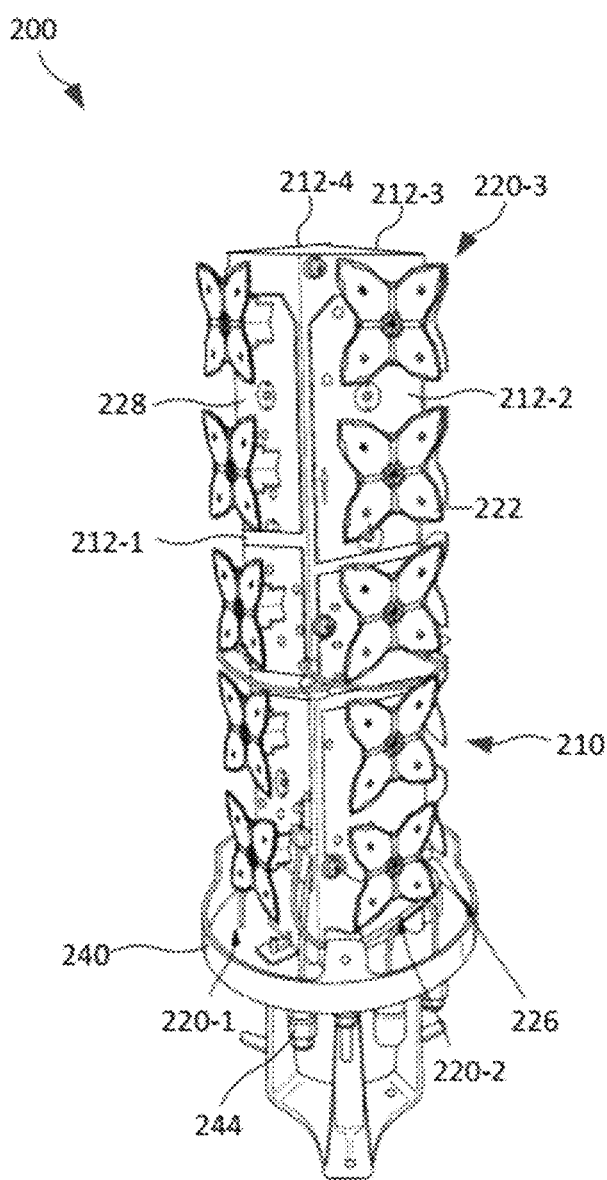
FIG. 4 is a schematic view of a base station antenna according to an exemplary embodiment of the present disclosure.

FIG. 4 is a perspective view of a beam-forming base station antenna 200 (where a radome and a top cover thereof are removed) that is suitable for use as a small cell base station antenna according to an embodiment of the present disclosure. As shown in FIG. 4, the small cell base station antenna 200 includes a rectangular tubular reflector assembly 210 with four faces 212-1 to 212-4. Four linear arrays 220-1 to 220-4 of a dual-polarized radiating element 222 are installed to extend outwardly from the corresponding faces 212 of the reflector assembly 210 (the fourth linear array 220-4 is invisible in FIG. 4, but it is the same as other linear arrays 220 except for pointing in a different direction). In addition, the signal processing device can be mounted in an internal space enclosed by the four faces 212-1 to 212-4 of the reflector assembly 210. The rectangular tubular reflector assembly 210 may include a single structure or may include a plurality of structures attached together. Each face 212 thereof may be used as a reflector and a ground plane of the dual-polarized radiating element 222 of the linear array 220 mounted thereon.

A plurality of RF terminals 244 may be installed in a bottom cover 240 of the base station antenna 200, and may be respectively electrically connected to a corresponding output port 252 of a plurality of output ports 252 of the beam-forming network 250 of the signal processing device. A total of eight RF terminals 244-1 to 244-8 can be provided, wherein two RF terminals 244 are coupled to each linear array 220. The first RF terminal 244 coupled to each linear array 220 may support communication at the first polarization, while the second RF terminal 244 coupled to each linear array 220 may support communication at the second polarization.

When the base station antenna 200 is installed for use, each linear array 220 may be substantially vertical relative to the horizontal direction such that each linear array 220 includes a column of radiating elements 222. In the depicted embodiment, each linear array 220 includes a total of five radiating elements 222. However, it will be understood that other numbers of radiating elements 222 may also be included in the linear array 220. In the illustrated embodiment, each linear array 220 is implemented as three sub-arrays of the radiating elements 222, wherein the top and bottom sub-arrays include two radiating elements 222 mounted on a same feed board 228, while the middle sub-array includes a single radiating element 222 mounted on its own feed boards 228. It should be understood that any suitable number of radiating elements 222 may be included in each sub-array, and the feed board 228 may be used or not be used. It will also be understood that different types of radiating elements 222 can be used. The base station antenna 200 may further include a radome and a top cover (not shown) covering and protecting the radiating element 222 of the base station antenna 200 and other components.

As noted above, some of the sub-arrays include a pair of radiating elements 222 mounted on a feed board 228. The feed board 228 may be configured to divide an RF signal provided thereto (the division does not have to be equal) into two sub-components, and feed each sub-component to a corresponding radiating element 222 of the radiating elements 222. The feed board 228 may include two inputs, i.e. one input for each polarization. A director (not shown) may be mounted forwardly of the dipole radiators 226 of each radiating element to narrow the beam width of the radiating element 222.

As discussed above, a small cell base station antenna according to an embodiment of the present disclosure may use a beam-forming network such as a Butler matrix to combine RF signals output by a radio and route the combined RF signals to a selected one of the linear arrays of the antenna. In this way, it is possible to use all transmitting power of the radio and guide an RF signal to a selected one of the linear arrays, which can be done on a time slot by time slot basis.

FIG. 3 is a simplified circuit diagram of the beam-forming network 250 that can be used to transmit RF signals between the four first polarized RF terminals 244 of the base station antenna 200 and the first polarized dipole radiator 226 of the radiating elements 222 of the four linear arrays 220 according to an embodiment of the present disclosure. FIG. 3 further shows the connection between the RF terminal 244 and the corresponding radio terminals 44-1 to 44-8 on the radio 42 (these radio terminals are respectively electrically connected to a corresponding input port 121 of the plurality of input ports 121 in the calibration circuit 120 of the signal processing device). The radio 42 may be an 8T/8R 5G radio device. FIG. 3 only illustrates the radio terminal 44, the RF terminal 244, and the beam-forming network 250 for one of two polarizations (for example, −45° polarization) supported by the base station antenna 200. It should be understood that the components shown in FIG. 3 will be repeated in the second polarization.

As shown in FIG. 3, the beam-forming network 250 may include four hybrid couplers 260-1 to 260-4 and a pair of 45° phase retarders 270. Each hybrid coupler 260 may include, for example, a four-port 90° hybrid coupler with a first input port 262-1 and a second input port 262-2, as well as a first output port 264-1 and a second output port 264-2. The four-port 90° hybrid coupler receives signals "A" and "B" at the two input ports 262-1 and 262-2, and outputs signals with an amplitude of "A/2+B/2" on each of the output ports 264-1 and 264-2, where there is a 90° phase difference between the two output signals. The 45° phase retarder 270 may include, for example, a retardation trace or a more complex phase retardation structure that can provide improved performance (i.e., consistent phase retardation) within a wider frequency range. It should be understood that one or more of 180° couplers combined with the retardation trace can be used instead of the 90° hybrid coupler.

As shown in FIG. 3, the input ports 262-1 and 262-2 of the first hybrid coupler 260-1 are coupled to the first terminal 44-1 and the second terminal 44-2 of the 5G radio 42, and the input ports 262-1 and 262-2 of the second hybrid coupler 260-2 are coupled to the third terminal 44-3 and the fourth terminal 44-4 of the 5G radio 42. The first output port 264-1 of the first hybrid coupler 260-1 is coupled to the input port of the first 45° phase retarder 270-1, and the second output port 264-2 of the first hybrid coupler 260-1 is coupled to the first input port 262-1 of the fourth hybrid coupler 260-4. The output port of the first 45° phase retarder 270-1 is coupled to the first input port 262-1 of the third hybrid coupler 260-3. The first output port 264-1 of the second hybrid coupler 260-2 is coupled to the second input port 262-2 of the third hybrid coupler 260-3, and the second output port 264-2 of the second hybrid coupler 260-2 is coupled to the input port of the second 45° phase retarder 270-2. The output port of the second 45° phase retarder 270-2 is coupled to the second input port 262-2 of the fourth hybrid coupler 260-4.

The RF signal output from the first output port 264-1 of the third hybrid coupler 260-3 is coupled to the −45° dipole radiator 226 of the radiating element 222 of the first linear array 220-1. The RF signal output from the second output port 264-2 of the third hybrid coupler 260-3 is coupled to the −45° dipole radiator 226 of the radiating element 222 of the third linear array 220-3. The RF signal output from the first output port 264-1 of the fourth hybrid coupler 260-4 is coupled to the −45° dipole radiator 226 of the radiating element 222 of the second linear array 220-2. The RF signal output from the second output port 264-2 of the fourth hybrid coupler 260-4 is coupled to the −45° dipole radiator 226 of the radiating element 222 of the fourth linear array 220-4.

As a result of the above connection, assuming that a signal "A" is output from the radio terminal 44-1, a signal "B" is output from the radio terminal 44-2, a signal "C" is output from the radio terminal 44-3, and a signal "D" is output from the radio terminal 44-4, then the phases of the sub-components of the signals A to D received at the linear arrays 220-1 to 220-4 are as follows:

Linear array 220-1: A+45°; B+135°; C+90°; D+180°
Linear array 220-2: A+90°; B+0°; C+225°; D+135°
Linear array 220-3: A+135°; B+225°; C+0°; D+90°
Linear array 220-4: A+180°; B+90°; C+135°; D+45°

Table 1 below shows the amplitude and phase of the RF signal (i.e., the amplitude and phase settings applied in the radio 42) input to the beam-forming network 250, which will cause all RF energy to be directed to a single linear array 220.

TABLE 1

| Radio terminal 44-1 | Radio terminal 44-2 | Radio terminal 44-3 | Radio terminal 44-4 | RF energy output | Peak beam position |
|---|---|---|---|---|---|
| 0.5/−45° | 0.5/−135° | 0.5/−90° | 0.5/−180° | 220-1 | 0° |
| 0.5/−90° | 0.5/−0° | 0.5/−225° | 0.5/−135° | 220-4 | 270° |

TABLE 1-continued

| Radio terminal 44-1 | Radio terminal 44-2 | Radio terminal 44-3 | Radio terminal 44-4 | RF energy output | Peak beam position |
|---|---|---|---|---|---|
| 0.5/−135° | 0.5/−225° | 0.5/0° | 0.5/−90° | 220-3 | 180° |
| 0.5/−180° | 0.5/−90° | 0.5/−135° | 0.5/−45° | 220-2 | 90° |

For example, focusing on the first row of Table 1, it can be seen that when the radio terminals 44-1 to 44-4 are respectively fed with signals having amplitude/phase of 0.5/−45°, 0.5/−135°, 0.5/−90°, and 0.5/−180°, the RF power at each linear array 220 is as follows:

Array 220-1=1
Array 220-2=0.5/45°+0.5/−135°+0.5/135°+0.5/−45°=0
Array 220-3=0.5/90°+0.5/90°+0.5/−90°+0.5/−90°=0
Array 220-4=0.5/135°+0.5/−45°+0.5/45°+0.5/−135°=0

In other words, by programming the 8T/8R radio 42 to apply appropriate amplitude and phase to the RF signals output from the four terminals of the first polarization, the small cell base station antenna 200 can be configured to output all RF energy to the linear array 220-1. By simply using an opposite combination on the phase of the signal output at each radio terminal 44, similar technology can be used to direct all RF energy to the second linear array 220-2, the third linear array 220-3, or the fourth linear array 220-4.

Therefore, Table 1 shows that by programming the radio 42 to apply an appropriate amplitude and phase weighting to the RF signals provided to the radio terminals 44-1 to 44-4, all RF energy transmitted through these radio terminals 44 is directed to a selected one of the four linear arrays 220.

It should be understood that FIG. 3 shows a specific design of the Butler matrix. A variety of different Butler matrix designs may be used, and the radio 42 may appropriately adjust the amplitude and phase of each input signal to route RF energy to the selected linear array 220. It will also be understood that beam-forming networks other than the Butler matrix may be used in some embodiments.

The base station antenna 200 can be relatively small, for example, its diameter can be about 8 inches, and its height may be about 2 feet. Such an antenna can be easily mounted on most telephone poles and street lights.

Figure 5:
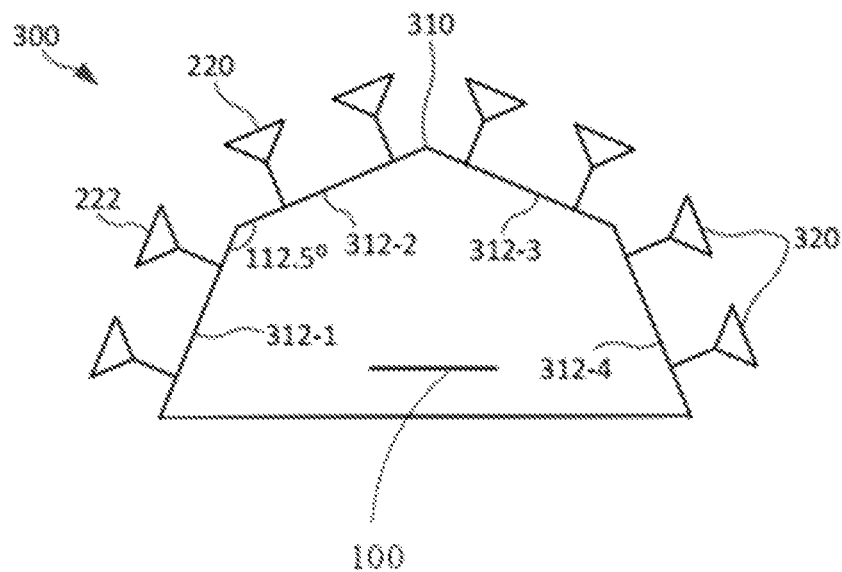
FIG. 5 is a schematic horizontal cross-sectional view of a base station antenna according to an exemplary embodiment of the present disclosure.

FIG. 5 is a schematic top view of a small cell beam-forming antenna 300 according to a further embodiment of the present disclosure. As shown in FIG. 5, the base station antenna 300 may include four faces 312-1 to 312-4 that together define a half-octagonal tube and an optional reflector assembly 310 of a rear wall. The signal processing device 100 may be set in a side of the reflector assembly that is opposite to the radiating element. Two rows of arrays 320 of the dual-polarized radiating elements 222 are installed in a side-by-side manner and extend out from each face 312 of the reflector assembly 310. Each two-row array 320 may comprise two linear arrays 220, and each linear array 220 comprises six radiating elements 222 respectively. FIG. 5 is a schematic top view of the base station antenna 300, in which only the radiating element 222 at the top of each linear array 220 can be seen. Each face 312 of the reflector assembly 310 can be used as a reflector and act as a ground plane for the dual-polarized radiating elements 222 mounted thereon. The base station antenna 300 may be suitable for providing coverage to a 180° area in the azimuth plane. For example, the base station antenna 300 can be mounted on the exterior wall of a building. In other embodiments, the tubular reflector assembly 310 with the half-octagonal horizontal cross-section of FIG. 5 may be replaced by a tubular reflector assembly with a full-octagonal horizontal cross-section, and eight additional linear arrays 220 may be provided. Such a base station antenna can be operated with two 8T/8R radios or a single 16T/16R radio.

Although the base station antenna 200 supports full 360° coverage area in the azimuth plane and the base station antenna 300 supports full 180° coverage area in the azimuth plane, it will be understood that the embodiments of the present disclosure are not limited thereto. Instead, a small cell base station antenna designed to cover any adjacent part or a plurality of non-adjacent parts in the azimuth plane may be provided.

Figure 6:
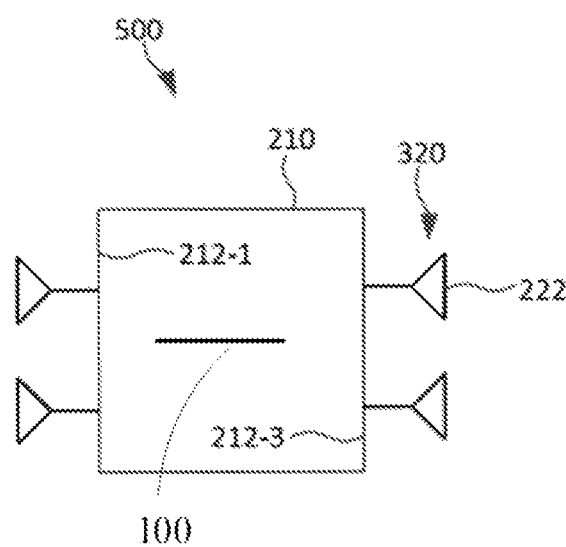
FIG. 6 is a schematic horizontal cross-sectional view of a base station antenna according to further another exemplary embodiment of the present disclosure.

Referring to FIG. 6, as another example, a small cell base station antenna 500 with a four-sided tubular reflector assembly 210 can be provided. However, the array 320 with the radiating elements 222 is only mounted on two opposite surfaces 212-1 and 212-3 of the tubular reflector assembly 210, and the signal processing device 100 can be set in an internal space enclosed by four surfaces. Each array 320 may be a multi-column array, for example, two columns (or three columns) of radiating elements 222. The base station antenna 500 may be particularly suitable for use on tunnels, bridges and/or long and straight highways. Since the array is only provided on two faces of the four faces 212 of the reflector assembly 210, the base station antenna 500 can also be operated with the 4T/4R TDD 5G radio.

It should also be understood that a small cell base station according to an embodiment of the present disclosure may be configured to output RF energy to more than one linear array 220 so as to generate antenna beams of other shapes. When all RF energy output by the four radio terminals 44-1 to 44-4 of the radio 42 is transmitted to a single linear array 220, the antenna beam may be the so-called "sector" antenna beam, and the "sector" antenna beam is designed to cover, for example, a 90° sector in the azimuth plane.

In addition, the pointing direction of the sector antenna beam may be adjusted by adjusting the weighting setting applied to the 8T/8R radio 42. For example, all RF energy output from the four radio terminals 44-1 to 44-4 of the radio device 42 can be directed to two adjacent linear arrays in the linear arrays 220 of the base station antenna 200, and not to a single linear array 220. This technology can be used to change the direction of the visual axis of the sector antenna beam, so that the peak gain of the sector antenna beam can point at any angle in the azimuth plane.

In addition, under certain circumstances, cellular operators may wish to generate antenna beams having shapes different from the "sector" shape. For example, in order to send control signals to all users in the coverage area of the base station antenna, the cellular operator may wish to generate an antenna beam with omnidirectional coverage on the azimuth plane. By weighting the amplitude and phase of the RF signals output from the radio terminals 44-1 to 44-4 by the method shown in Table 2, it is possible to generate an antenna beam with a substantially omnidirectional coverage in the azimuth plane.

TABLE 2

| Radio terminal 44-1 | Radio terminal 44-2 | Radio terminal 44-3 | Radio terminal 44-4 |
|---|---|---|---|
| 0.5/−45° | 0.5/−135° | 0.5/−135° | 0.5/−45° |

Cellular operators are sometimes also interested in deploying base station antennas that generate so called "heart-shaped" antenna beams to provide coverage over 180° in the azimuth plane. For example, by weighting the amplitude and phase of the RF signals output from the radio terminals 44-1 to 44-4 in the manner shown in Table 3, the base station antennas according to the embodiments of the present disclosure can also easily form such a heart-shaped antenna beam.

TABLE 3

| Radio terminal 44-1 | Radio terminal 44-2 | Radio terminal 44-3 | Radio terminal 44-4 |
|---|---|---|---|
| 0.5/−45° | 0.5/−45° | 0.5/−45° | 0.5/−45° |

In addition, the pointing direction of the heart-shaped antenna beam can also be adjusted to point in any direction in the azimuth plane by directing the RF energy to three of the linear arrays 220 with appropriate amplitude and phase weighting applied by the radio 42.

Cellular operators are sometimes also interested in deploying base station antennas that generate so-called "two-way" antenna beams that provide coverage in two opposite directions in the azimuth plane. An antenna beam having a two-way shape in the azimuth plane can be useful to provide coverage on, for example, long and straight highways and/or bridges, tunnels, etc. For example, by weighting the amplitude and phase of the RF signals output from the radio terminals 44-1 to 44-4 in the manner shown in Table 4, the base station antenna according to the embodiments of the present disclosure can also easily form such a "two-way" antenna beam.

TABLE 4

| Radio terminal 44-1 | Radio terminal 44-2 | Radio terminal 44-3 | Radio terminal 44-4 |
|---|---|---|---|
| 0.5/−113° | 0.5/−207° | 0.5/−254° | 0.5/−335° |

It should be understood that, without departing from the scope of the present disclosure, the aforementioned antennas may be modified in many ways. For example, the base station antenna 200 may comprise less than or more than four linear arrays 220.

As shown above, the small cell beam-forming base station antenna according to the embodiments of the present disclosure can generate various standard antenna beams (omnidirectional, sectoral, heart-shaped, two-way), while doing so can use all transmitting power of cellular radio devices. In addition, by integrating the beam-forming network and the calibration circuit on the same substrate and connecting the beam-forming network and the calibration circuit by the connection traces on the substrate, it is possible to meet the requirements of miniaturization and low cost of base station antennas and to easily reduce the attenuation and impedance mismatch occurring in the base station antenna to improve the performance of the base station antenna and save costs.

In addition, the embodiments of the present disclosure may further include the following examples.

1. A signal processing device, wherein the signal processing device comprises: a substrate; a beam-forming network, provided on one side of the substrate; and a calibration circuit, provided on the same side of the substrate on which the beam-forming network is provided; wherein the beam-forming network is connected to the calibration circuit via a connection trace on the substrate.

2. The signal processing device according to 1, wherein at least a part of the beam-forming network, at least a part of the calibration circuit, and the connection trace are integrally formed.

3. The signal processing device according to 1, wherein the connection trace is a part of a trace that forms at least one of the beam-forming network and the calibration circuit.

4. The signal processing device according to 1, wherein the connection trace is configured in a shape so as to match impedance at a connection between the beam-forming network and the calibration circuit.

5. The signal processing device according to 4, wherein the connection trace includes a meandered portion.

6. The signal processing device according to 5, wherein the meandered portion is configured to have a length so as to match impedance at the connection between the beam-forming network and the calibration circuit.

7. The signal processing device according to 1, wherein the beam-forming network includes a plurality of input ports, the calibration circuit includes a plurality of output ports, each input port of the plurality of input ports of the beam-forming network is respectively connected to a corresponding output port of the plurality of output ports of the calibration circuit through a corresponding connection trace.

8. The signal processing device according to 7, wherein a plurality of connection traces extend parallel to each other on the substrate.

9. The signal processing device according to 7, wherein in a direction perpendicular to the extension of the connection traces, the plurality of connection traces are uniformly dispersed on the substrate.

10. The signal processing device according to 1, wherein the beam-forming network is a passive beam-forming network.

11. The signal processing device according to 10, wherein the passive beam-forming network includes a Butler matrix.

12. The signal processing device according to 11, wherein the Butler matrix comprises a first hybrid coupler, a second hybrid coupler, a third hybrid coupler and a fourth hybrid coupler, as well as a first phase retarder and a second phase retarder, wherein: a first input port of the first hybrid coupler is used as a first input port of the Butler matrix, a second input port of the first hybrid coupler is used as a second input port of the Butler matrix, a first output port of the first hybrid coupler is connected to a first input port of the third hybrid coupler via the first phase retarder, and a second output port of the first hybrid coupler is connected to a first input port of the fourth hybrid coupler; a first input port of the second hybrid coupler is used as a third input port of the Butler matrix, a second input port of the second hybrid coupler is used as a fourth input port of the Butler matrix, a first output port of the second hybrid coupler is connected to a second input port of the third hybrid coupler, and a second output port of the second hybrid coupler is connected to a second input port of the fourth hybrid coupler via the second phase retarder; a first output port of the third hybrid coupler is used as a first output port of the Butler matrix, and a second output port of the third hybrid coupler is used as a second output port of the Butler matrix; and a first output port of the fourth hybrid coupler is used as a third output port of the Butler matrix, and a second output port of the fourth hybrid coupler is used as a fourth output port of the Butler matrix.

13. The signal processing device according to 12, wherein the first phase retarder and the second phase retarder are respectively 45° phase retardation traces.

14. The signal processing device according to 1, wherein the calibration circuit comprises: a plurality of transmission paths, the plurality of transmission paths being respectively connected between a corresponding input port of the plurality of input ports and a corresponding output port of the plurality of output ports of the calibration circuit; a plurality of coupling paths, each of the plurality of coupling paths being arranged at least partially adjacent to a corresponding transmission path of the plurality of transmission paths such that a part of a signal in a transmission path corresponding to each of the coupling paths is coupled to the transmission path and travels in the coupling path; and a power divider, a plurality of input ports of the power divider being respectively connected to the plurality of coupling paths, and an output port of the power divider being used as a calibration port of the calibration circuit.

15. The signal processing device according to 14, wherein each transmission path of the calibration circuit has the same length.

16. The signal processing device according to 14, wherein each coupling path of the calibration circuit has the same length.

17. The signal processing device according to 14, wherein each assigned path connected between each input port and output port of the power divider has the same length.

18. A base station antenna, including: a reflector assembly, including a plurality of reflector plates facing different directions; a plurality of sets of radiating element arrays, each set of radiating element arrays in the plurality of sets of radiating element arrays being respectively arranged on an outer side of a corresponding reflector plate of the plurality of reflector plates; and the signal processing device according to any one of 1 to 17, wherein the beam-forming network of the signal processing device is connected to the plurality of sets of radiating element arrays, and the signal processing device is provided in a space inside the plurality of reflector plates.

19. The base station antenna according to 18, wherein the reflector assembly is cylindrical.

20. The base station antenna according to 18, wherein each output port of the beam-forming network is respectively connected to a set of radiating elements or a row of radiating elements in the plurality of sets of radiating element arrays.

As used herein, the words "front," "rear," "top," "bottom," "above," "below," etc., if present, are used for descriptive purposes and are not necessarily used to describe constant relative positions. It should be understood that the terms used in this way are interchangeable under appropriate circumstances, so that the embodiments of the present disclosure described herein, for example, can be operated on other orientations that differ from those orientations shown herein or otherwise described.

As used herein, the word "exemplary" means "serving as an example, instance, or illustration" rather than as a "model" to be copied exactly. Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means any minor changes including those caused by design or manufacturing defects, device or component tolerances, environmental influences, and/or other factors. The word "basically" also allows the gap from the perfect or ideal situation due to parasitic effects, noise, and other practical considerations that may be present in the actual realization.

In addition, the above description may have mentioned elements or nodes or features that are "connected" or "coupled" together. As used herein, unless explicitly stated otherwise, "connect" means that an element/node/feature is electrically, mechanically, logically, or in other manners connected (or communicated) with another element/node/feature. Similarly, unless explicitly stated otherwise, "coupled" means that one element/node/feature can be mechanically, electrically, logically or otherwise connected with another element/node/feature in a direct or indirect manner to allow interaction, even though the two features may not be directly connected. That is, "coupled" is intended to comprise direct and indirect connection of components or other features, including connection using one or a plurality of intermediate components.

In addition, for reference purposes only, "first," "second" and similar terms may also be used herein, and thus are not intended to be limitative. For example, unless the context clearly indicates, the words "first," "second" and other such numerical words involving structures or elements do not imply a sequence or order.

It should also be noted that, as used herein, the words "include/comprise," "contain," "have," and any other variations indicate that the mentioned features, entireties, steps, operations, elements and/or components are present, but do not exclude the presence or addition of one or a plurality of other features, entireties, steps, operations, elements, components and/or combinations thereof.

In the present disclosure, the term "provide" is used in a broad sense to cover all ways of obtaining an object, so "providing an object" includes but is not limited to "purchase," "preparation/manufacturing," "arrangement/setting," "installation/assembly," and/or "order" of the object, etc.

Those skilled in the art should realize that the boundaries between the above operations are merely illustrative. A plurality of operations can be combined into a single operation, which may be distributed in the additional operation, and the operations can be executed at least partially overlapping in time. Also, alternative embodiments may include a plurality of instances of specific operations, and the order of operations may be changed in various other embodiments. However, other modifications, changes and substitutions are also possible. Therefore, the Specification and attached drawings hereof should be regarded as illustrative rather than restrictive.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

What is claimed is:

1. A signal processing device, comprising:
a substrate;
a beam-forming network, provided on a first side of the substrate; and
a calibration circuit that is configured to extract a portion of a test signal to calibrate amplitude and phase weights, the calibration circuit provided on the first side of the substrate,
wherein the beam-forming network is connected to the calibration circuit via a connection trace on the substrate.

2. The signal processing device according to claim 1, wherein at least a part of the beam-forming network, at least a part of the calibration circuit, and the connection trace are integrally formed.

3. The signal processing device according to claim 1, wherein the connection trace is a part of a trace that forms at least one of the beam-forming network and the calibration circuit.

4. The signal processing device according to claim 1, wherein the beam-forming network includes a plurality of input ports, the calibration circuit includes a plurality of output ports, each input port of the plurality of input ports of the beam-forming network is respectively connected to a corresponding output port of the plurality of output ports of the calibration circuit through a corresponding connection trace.

5. The signal processing device according to claim 4, wherein a plurality of connection traces extend parallel to each other on the substrate.

6. The signal processing device according to claim 5, wherein in a direction perpendicular to an extension direction of the connection traces, the plurality of connection traces are uniformly dispersed on the substrate.

7. The signal processing device according to claim 1, wherein the beam-forming network is a passive beam-forming network.

8. The signal processing device according to claim 7, wherein the passive beam-forming network includes a Butler matrix.

9. The signal processing device according to claim 8, wherein the Butler matrix comprises a first hybrid coupler, a second hybrid coupler, a third hybrid coupler and a fourth hybrid coupler, as well as a first phase retarder and a second phase retarder, wherein:
a first input port of the first hybrid coupler is used as a first input port of the Butler matrix, a second input port of the first hybrid coupler is used as a second input port of the Butler matrix, a first output port of the first hybrid coupler is connected to a first input port of the third hybrid coupler via the first phase retarder, and a second output port of the first hybrid coupler is connected to a first input port of the fourth hybrid coupler;
a first input port of the second hybrid coupler is used as a third input port of the Butler matrix, a second input port of the second hybrid coupler is used as a fourth input port of the Butler matrix, a first output port of the second hybrid coupler is connected to a second input port of the third hybrid coupler, and a second output port of the second hybrid coupler is connected to a second input port of the fourth hybrid coupler via the second phase retarder;
a first output port of the third hybrid coupler is used as a first output port of the Butler matrix, and a second output port of the third hybrid coupler is used as a second output port of the Butler matrix; and
a first output port of the fourth hybrid coupler is used as a third output port of the Butler matrix, and a second output port of the fourth hybrid coupler is used as a fourth output port of the Butler matrix.

10. The signal processing device according to claim 9, wherein the first phase retarder and the second phase retarder are respectively 45° phase retardation traces.

11. The signal processing device according to claim 1, wherein the calibration circuit comprises:
a plurality of transmission paths, the plurality of transmission paths being respectively connected between a corresponding input port of a plurality of input ports and a corresponding output port of a plurality of output ports of the calibration circuit;
a plurality of coupling paths, each of the plurality of coupling paths being arranged at least partially adjacent to a corresponding transmission path of the plurality of transmission paths such that a part of a signal in a transmission path corresponding to each of the coupling paths is coupled to the transmission path and travels in the coupling path; and
a power divider, a plurality of input ports of the power divider being respectively connected to the plurality of coupling paths, and an output port of the power divider being used as a calibration port of the calibration circuit.

12. The signal processing device according to claim 11, wherein each transmission path of the calibration circuit has the same length.

13. The signal processing device according to claim 11, wherein each coupling path of the calibration circuit has the same length.

14. The signal processing device according to claim 11, wherein each assigned path connected between each input port and output port of the power divider has the same length.

15. A signal processing device, comprising:
a substrate;
a beam-forming network, provided on a first side of the substrate; and
a calibration circuit, provided on the first side of the substrate,
wherein the beam-forming network is connected to the calibration circuit via a connection trace on the substrate,
wherein the connection trace is configured in a shape so as to match impedance at a connection between the beam-forming network and the calibration circuit.

16. The signal processing device according to claim 15, wherein the connection trace includes a meandered portion.

17. The signal processing device according to claim 16, wherein the meandered portion is configured to have a length so as to match impedance at the connection between the beam-forming network and the calibration circuit.

18. A base station antenna, including:
a reflector assembly, including a plurality of reflector plates facing different directions;
a plurality of sets of radiating element arrays, each set of radiating element arrays in the plurality of sets of radiating element arrays being respectively arranged on an outer side of a corresponding reflector plate of the plurality of reflector plates; and
a signal processing device, comprising:
a substrate;
a beam-forming network provided on a first side of the substrate; and a calibration circuit provided on the first side of the substrate;

wherein the beam-forming network is connected to the calibration circuit via a connection trace on the substrate, and wherein the beam-forming network of the signal processing device is connected to the plurality of sets of radiating element arrays, and the signal processing device is provided in a space inside the plurality of reflector plates.

19. The base station antenna according to claim 18, wherein the reflector assembly is cylindrical.

20. The base station antenna according to claim 18, wherein each output port of the beam-forming network is respectively connected to a set of radiating elements or a row of radiating elements in the plurality of sets of radiating element arrays.

* * * * *